J. J. JASPERSON.
EXPANDING REAMER.
APPLICATION FILED JULY 19, 1920.

1,422,205.

Patented July 11, 1922.
2 SHEETS—SHEET 1.

Inventor
J. J. Jasperson,
By H. R. Kerslake.
Attorney

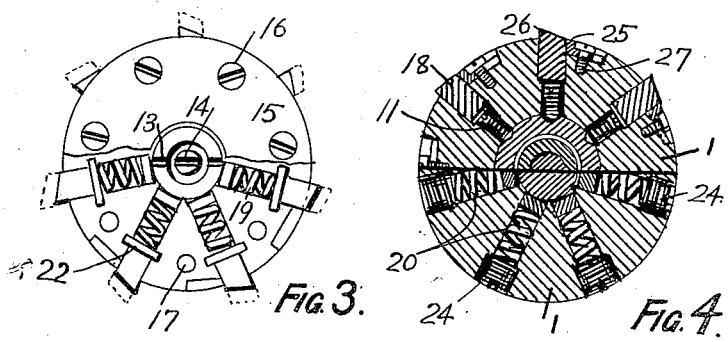
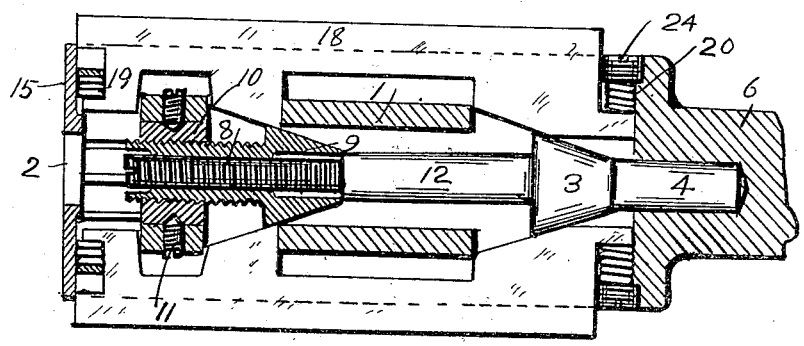
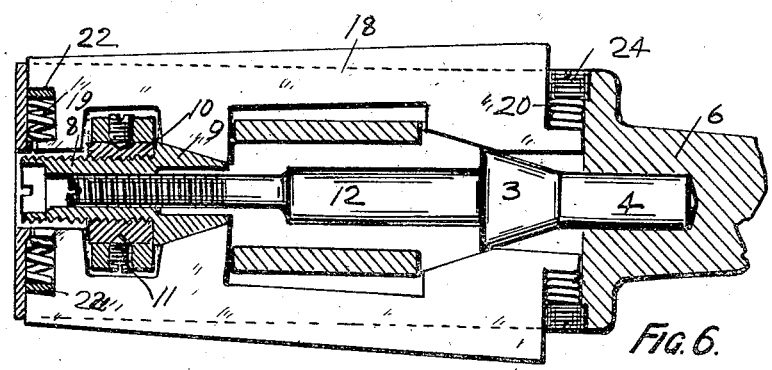

UNITED STATES PATENT OFFICE.

JOHN JULIUS JASPERSON, OF RANDWICK, NEAR SYDNEY, NEW SOUTH WALES, AUSTRALIA.

EXPANDING REAMER.

1,422,205. Specification of Letters Patent. Patented July 11, 1922.

Application filed July 19, 1920. Serial No. 397,223.

*To all whom it may concern:*

Be it known that JOHN JULIUS JASPERSON, citizen of Russia, residing at "Milton," Earl Street, Randwick, near Sydney, New South Wales, Australia, has invented certain new and useful Improvements in Expanding Reamers, of which the following is a specification.

This invention relates to an expanding reamer which is usable as a machinist's tool in truing or enlarging openings or bores in solid metal work and which may be operated either by hand or by power. The openings operated on may be shaped either cylindrical or tapering.

The reamer comprises a shank having a series of slots in each of which a removable cutter blade may be securely held; a rotatable spindle having a conical shoulder at one end and its other end screw-threaded and fitting a rotatable tapped sleeve, one end of which is conical; a tapped collar secured to the said shank within which said sleeve may be rotated; springs fitting within the said shank adapted to position the cutter blades in the slots thereof; an end cover plate for the shank; and backing plates for the cutter blades.

Figure 1:
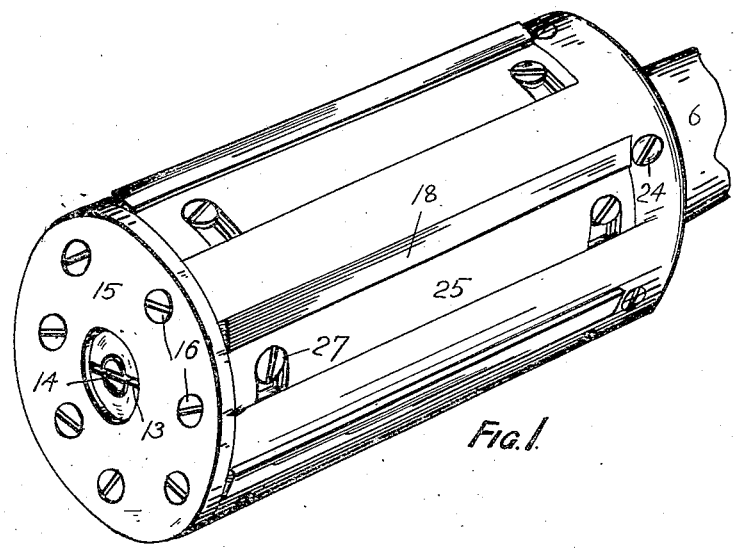
Figure 2:
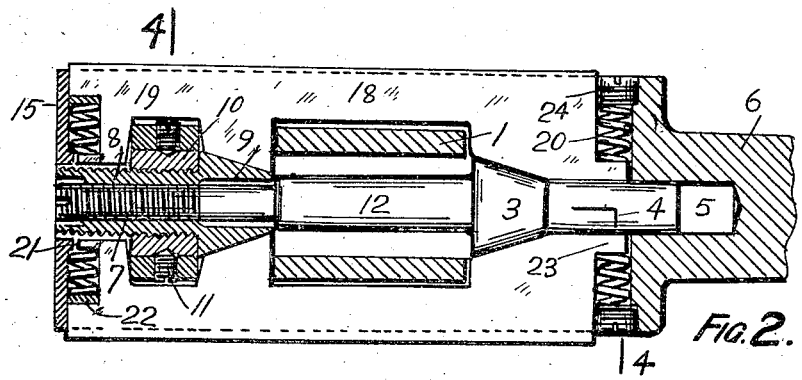

Referring to the accompanying drawings which illustrate a reamer in accordance with the invention, Fig. 1 is a perspective view of the reamer with the stem of the shank broken away; Fig. 2 a longitudinal section thereof; Fig. 3 an end elevation and part transverse section of the reamer showing the springs at the front end thereof; Fig. 4 a transverse section on line 4—4 Fig. 2; Fig. 5 a longitudinal section showing two blades of the reamer expanded to cut a cylindrical opening; and Fig. 6 a section similar to Fig. 5 but showing the blades expanded to cut a tapering opening.

The body 1 of the reamer is recessed to carry a spindle having the conical shoulder 3 and tail portion 4 adapted to slide within the recess 5 in the shank 6. Such shank may have its outer end squared to enable a turning handle to be readily fitted thereto to permit the reamer to be rotated by hand. If required, however, the reamer may be operated by power by connecting the shank 6 to suitable mechanism by means of which the reamer may be rotated. The front end 7 of the spindle is screw-threaded and fits a tapped rotatable sleeve 8 whose inner end is provided with a conical shoulder 9. A tapped collar 10, which is secured to the body 1 by two or more screws 11 or other suitable means, carries the sleeve 8 with the front end 7 of the spindle therein. Said spindle is preferably enlarged at 12. At the heads of the sleeve 8 and the spindle respectively, nicks 13 and 14 are furnished to enable the former to be rotated by a screw driver or other suitable tool within the collar 10 and the spindle within the sleeve 8.

A cover plate 15 having an opening 2 is fitted to the front end of the body 1 by the removable screws 16. These screws fit tapped openings 17 in the body 1. Such body has a series of slots in it in which the cutter blades 18, having cutting edges 26, may be mounted. The construction of these blades will be seen on reference to Figs. 2, 3 and 4; they are recessed at their front and rear portions to take about the coiled springs 19 and 20, and their inner ends are also shaped to fit respectively about the conical shoulder 9 on the sleeve 8 and the conical shoulder 3 on the spindle. One end of the coiled springs 19 abuts the inner front ends 21 of the blades 18, whilst the other end of such springs abuts removable slide pieces 22, which are adapted to be mounted in slots within the body 1. The springs 20 are carried in slots at the rear of the reamer, and their ends abut respectively the rear inner ends 23 of the blades 18 and the screws 24. To remove a blade from the slot provided for it in the body 1 it is necessary to remove the cover plate 15, the slide piece 22 and the spring 19 abutting it and the blade, and also the screw 24 and the spring 20 at the rear of the blade. The springs 19 and 20 serve to keep the blades 18 in position within the slots in the body 1.

Backing plates 25 are also furnished for rigidly supporting the blades 18 in the slots in the body 1. A separate backing plate may be provided for the rear side of each blade 18, and in Figure 4 the plates 25 are shown as L-shaped. The plates 25 are affixed to the body 1 by screws 27; these plates must be eased from close contact with the sides of the blades 18 when the latter are to be removed from the body 1 either for grinding or sharpening or other purposes. It will be understood that if the vertical edges of the plates 25 are made to extend outwardly from the circumference of the body 1 blades of greater depth may be used in reamers whose bodies are of limited diameter.

When it is desired to expand the blades 18 in equal proportion from the circumference of the body 1 of the reamer for the purpose of truing or enlarging a straight or cylindrical opening in metal, the plates 25 are first eased out of contact with the blades. The sleeve 8 and the spindle carrying the conical shoulder 3 are then simultaneously rotated by means of a screw driver or other suitable tool whose working edge is brought into engagement with the nicks 13 and 14 in the heads of said sleeve and spindle. Upon such rotation the blades 18 are expanded in equal proportion through the conical shoulders 9 and 3 operating to force the blades radially outward which will be seen on reference to Fig. 5 of the drawings. If, however, it is intended to utilize the reamer for the purpose of truing or enlarging an opening which is to be tapering, it is only necessary to rotate the spindle having the conical shoulder 3, when that shoulder will operate to expand the rear ends of the blades 18 from the circumference of the body 1 against the tension exerted on such rear ends by the springs 20. In Fig. 6, the reamer is shown with the rear ends of the blades 18 projecting further from the body 1 than is the case with the front ends of the blades. By rotating the spindle only, its conical shoulder 3 in forcing the rear ends of the blades 18 radially outward, compresses the springs 20, whilst the springs 19 are also slightly compressed. The springs 19 and 20 are equally compressed when both the spindle having the shoulder 3 and the collar 8 are simultaneously rotated. After the blades 18 have been expanded as required, the backing plates 25 are again secured in contact with the sides of the blades. The working end of the screw driver or like tool may be inserted through the opening 2 in the cover plate 15, and it is therefore unnecessary to remove that plate from the reamer when the blades 18 are to be expanded.

What I claim as my invention and desire to secure by Letters Patent is:—

1. An expanding reamer comprising a shank with a body, a rotatable spindle arranged in the body and having a conical shoulder at one end and screw-threaded at the other end, a rotatable screw-threaded sleeve supporting the threaded end of said spindle and having a conical shoulder, a tapped collar detachably secured on the interior of said body within which said sleeve is mounted, a plurality of cutter blades adapted to be mounted within recesses in said body and to be expanded radially outward from the circumference thereof by rotating said spindle and sleeve, springs mounted within said body and engaging the front and rear ends of said cutter blades to position them within said body, an end cover plate for said body, and backing plates for said blades detachably affixed to said body.

2. An expanding reamer comprising a body having an end cover plate and a stem with slot centrally thereof, a rotatable spindle mounted within a recess in said body and carrying a conical shoulder at one end which end fits the slot in said stem and screw threaded at its other end, a tapped sleeve fitting the threaded end of said spindle, a collar detachably secured to the interior of said body supporting said sleeve, a plurality of cutter blades fitting recesses in said body and the rear ends of which are adapted to be expanded radially outward from the circumference of said body by rotating said spindle, springs mounted within said body and engaging the front and rear ends of said blades to position them within said body, and backing plates for said blades detachably secured to said body.

3. An expanding reamer comprising a body carrying a slotted stem, a rotatable spindle with conical shoulder slidably supported at one end in said slotted stem and screw-threaded at its other end, a rotatable tapped sleeve with conical shoulder fitting a tapped collar detachably secured to the interior of said body, a slotted end cover plate for said body, slots in the forward end of said body adapted to carry slide pieces, a plurality of cutter blades mounted within recesses in said body and capable of being expanded radially outward from the circumference of said body by rotating said sleeve and spindle, coiled springs fitting slots in the front ends of said blades, whose ends abut respectively said slide pieces and the inner end of said blades, coiled springs fitting slots in the rear end of said body and abutting at their ends respectively with the inner rear ends of said blades and with screws mounted in said body, and backing plates for said blades detachably secured to said body.

4. An expansible reamer including a body portion provided with a central bore and radial slots, radial movable cutting blades mounted in said slots, resilient means arranged within the body portion and engaging the ends of the blades for yieldingly forcing the same towards the axis of the body portion, and a plurality of independently adjustable members mounted in said bore and engaging said blades, the independent adjustment of said members permitting the expansion of one end of the blades independently of the other end of the blades.

5. An expansible reamer including a body portion provided with a central bore and radial slots, a plurality of radially movable cutter blades mounted in said slots, springs arranged in said slots and engaging the ends of the blades for yieldingly forcing the same towards the axis of the body portion, an internally threaded nut arranged in the bore of the body portion and secured to the body portion, an externally threaded sleeve engaging the threads of said nut and provided with a conical surface engaging the inner edges of the blades, said sleeve being provided with internal threads, and an axially movable and rotatable spindle mounted in said bore and provided at one end with external threads which engage the external threads of the sleeve, said spindle being provided with a conical surface engaging the inner edges of said blades.

In testimony whereof I have affixed my signature.

JOHN JULIUS JASPERSON.